United States Patent [19]

Ross

[11] Patent Number: 5,637,350
[45] Date of Patent: Jun. 10, 1997

[54] ENCAPSULATION OF ASPHALT PRILLS

[75] Inventor: Eugene A. Ross, Calgary, Canada

[73] Assignee: A.P.I. Asphalt Prilling Inc., Vancouver, Canada

[21] Appl. No.: 456,708

[22] Filed: Jun. 1, 1995

Related U.S. Application Data

[63] Continuation-in-part of Ser. No. 242,414, May 13, 1994, abandoned.

[51] Int. Cl.$^6$ .................. B05D 7/00; B29B 9/00
[52] U.S. Cl. .......... 427/212; 427/215; 427/402; 427/403; 427/407.1; 427/413; 427/421; 427/422; 264/5; 264/7; 264/8; 264/13; 75/332; 425/10
[58] Field of Search .................. 427/212, 215, 427/421, 422, 402, 403, 407.1, 413; 264/5, 7, 8, 13; 75/332; 425/10

[56] References Cited

U.S. PATENT DOCUMENTS

| | | |
|---|---|---|
| 2,484,792 | 10/1949 | Mollring . |
| 2,870,080 | 1/1959 | Illman et al. . |
| 3,026,568 | 3/1962 | Moar . |
| 3,036,338 | 5/1962 | Nack . |
| 3,143,428 | 8/1964 | Reimers et al. . |
| 3,323,166 | 6/1967 | Ross . |
| 3,533,776 | 10/1970 | Coates et al. . |
| 3,661,620 | 5/1972 | Dekking et al. . |
| 3,686,373 | 8/1972 | Griesheimer et al. . |
| 3,767,738 | 10/1973 | Fonseca et al. . |
| 3,779,785 | 12/1973 | Stiles et al. . |
| 3,951,638 | 4/1976 | Bradley . |
| 3,997,636 | 12/1976 | Bennett . |
| 4,107,382 | 8/1978 | Augustine . |
| 4,359,492 | 11/1982 | Schlademan ............ 427/222 |
| 4,801,498 | 1/1989 | Duvdevani et al. . |
| 4,939,000 | 7/1990 | Dodds et al. . |
| 5,254,385 | 10/1993 | Hazlett ............ 428/76 |

FOREIGN PATENT DOCUMENTS 1160988  8/1969  United Kingdom .

Primary Examiner—Benjamin Utech
Assistant Examiner—David M. Maiorana
Attorney, Agent, or Firm—Oyen Wiggs Green & Mutala

[57] ABSTRACT

An encapsulated asphalt prill having an impervious, water-insoluble shell, and a process for making same are disclosed. The encapsulating material are preferably composed primarily of materials such as molten fatty acids, low melt polymers, waxes, elastomers (synthetic rubbers) or plastomers many of which are also used as blending agents to enhance the final use properties of the commercial asphalt end products.

11 Claims, 2 Drawing Sheets

ENCAPSULATION OF ASPHALT PRILLS

CROSS-REFERENCE TO RELATED APPLICATIONS

This application is a continuation-in-part of application Ser. No. 08/242,414 filed May 13, 1994 entitled "Process for Prilling Asphalt" now abandoned.

FIELD OF THE INVENTION

This invention relates to the production of solid asphalt prills from a molten asphalt feedstock. More particularly the invention relates to the production of stable and free-flowing solid asphalt prills encapsulated within an impervious coating or shell.

BACKGROUND OF THE INVENTION

Currently asphalt used in paving roofing and the like is generally stored, moved and transported in a hot molten state since asphalt is solid and does not flow at ambient temperatures. Storing and shipping asphalt in the molten state is both costly and environmentally unfriendly. It would be desirable to provide a particulate asphalt product which is free-flowing at ambient temperatures since this would result in energy savings and would also avoid the accidents to workers which occur in the transporting of hot molten asphalt as well as the problems created by the unpleasant asphalt odours, and oxidative deterioration of the asphalt.

It has long been known that various non-viscous and viscous sticky materials can be successfully sprayed in a molten state to form spherical droplets. The droplets can then be cooled in an air tower or water-cooled (hydroprilling) tower to produce solidified droplets, or prills. The present inventor's U.S. Pat. No. 3,323,166 issued Jun. 6, 1967 is an example of such an apparatus used for prilling materials such as myristyl alcohol, coal tar resin caustic soda, wax plastic, hydrocarbon resin and coal tar pitch. Although it has often been shown that asphalt and like materials can be prilled, the difficulties encountered in handling prilled asphalt after it is fully solidified have blocked all attempts to produce a viable solid prilled asphalt product. Prills made from most asphalts are extremely sticky, even when dropped into a water bath for solidification, and agglomerate into an unmanageable mass.

The existing approach to solving the problem of agglomeration of asphalt prills has involved powdered coatings. See for example U.S. Pat. No. 3,016,568 J. Moar issued Mar. 27, 1962; U.S. Pat. No. 3,036,338 H. Nack issued May 29, 1962 and U.S. Pat. No. 4,107,382 H. Augustine et al. issued Aug. 15, 1978. Very fine powders of materials such as clays, line, talc, diatomaceous earths, and carbon black have been tried as coatings for the asphalt prills with varying degrees of success. Powder coatings alone, however, do not stand up over long periods of time, or under adverse climatic conditions, particularly where high ambient temperatures are present. The liquid asphalt from the prill slowly leaches through such coatings causing an increasing degree of agglomeration during storage and shipping. Further some coatings may have a negative effect on the asphalt product produced from the prills.

There is therefore a need for an asphalt prill which does not result in agglomeration of the asphalt prills during transporting or storage under the range of temperatures which might be encountered and in which the coating material enhances the properties of the asphalt end product.

SUMMARY OF THE INVENTION

The present invention provides encapsulated asphalt prills having an impervious, water-insoluble shell, and a process for making same. The encapsulating materials are preferably composed primarily of materials such as water-insoluble molten fatty acids, low-melt polymers, waxes, elastomers (synthetic rubbers) or plastomers, many of which are also used as blending agents to enhance the final use properties of commercial asphalt end products.

In a first process for producing the invention, the process uses hot, molten materials for encapsulation. The partially solidified droplets fall through an externally heated encapsulating chamber equipped with spray nozzles at spaced elevations. At this point, the droplets are coated with one of various water-insoluble molten fatty acids, low-melt polymers, or waxes. The encapsulated prills fall into a bath where final cooling and solidification of both the asphalt and the coating occurs.

In a second process for producing the invention, using ambient temperature encapsulating materials, the droplets from the prilling tower are spray-coated with one of several aqueous elastomer (synthetic rubbers) or plastomer dispersions. The wet, encapsulated prills are dropped into a mixing device where a finely-divided powder is added to enhance drying of the coating. The powder adheres to the wet surface of the encapsulated prills absorbing water from the coating and solidifying the shell.

BRIEF DESCRIPTION OF THE DRAWINGS

In drawings which illustrate preferred embodiments of the invention.

DETAILED DESCRIPTION OF THE PREFERRED EMBODIMENT

The present invention is an asphalt prill which has a water-insoluble encapsulation which is impermeable to asphalt leaching. Such encapsulation can be achieved by coating the asphalt prill with additives which are currently added to the asphalt to improve the properties of the end product. Examples are molten fatty acids, low-melt polymers, and elastomers (synthetic rubbers) or plastomers. The encapsulated asphalt of the invention can be a penetration industrial asphalt in the range 0 to 500 PEN.

Two methods have been developed to encapsulate asphalt prills according to the invention. The first method uses hot, molten materials as coating agents. These solidify immediately when cooled by water to ambient temperatures and require no further treatment. The second method uses ambient temperature liquid coatings which must be dried, or cured, subsequent to the prills leaving the coating chamber. Both methods achieve an imperviously encapsulated asphalt prill, but equipment to handle the two different types of encapsulation is, of necessity, somewhat different.

HOT-MELT ENCAPSULATING METHOD

Figure 1:
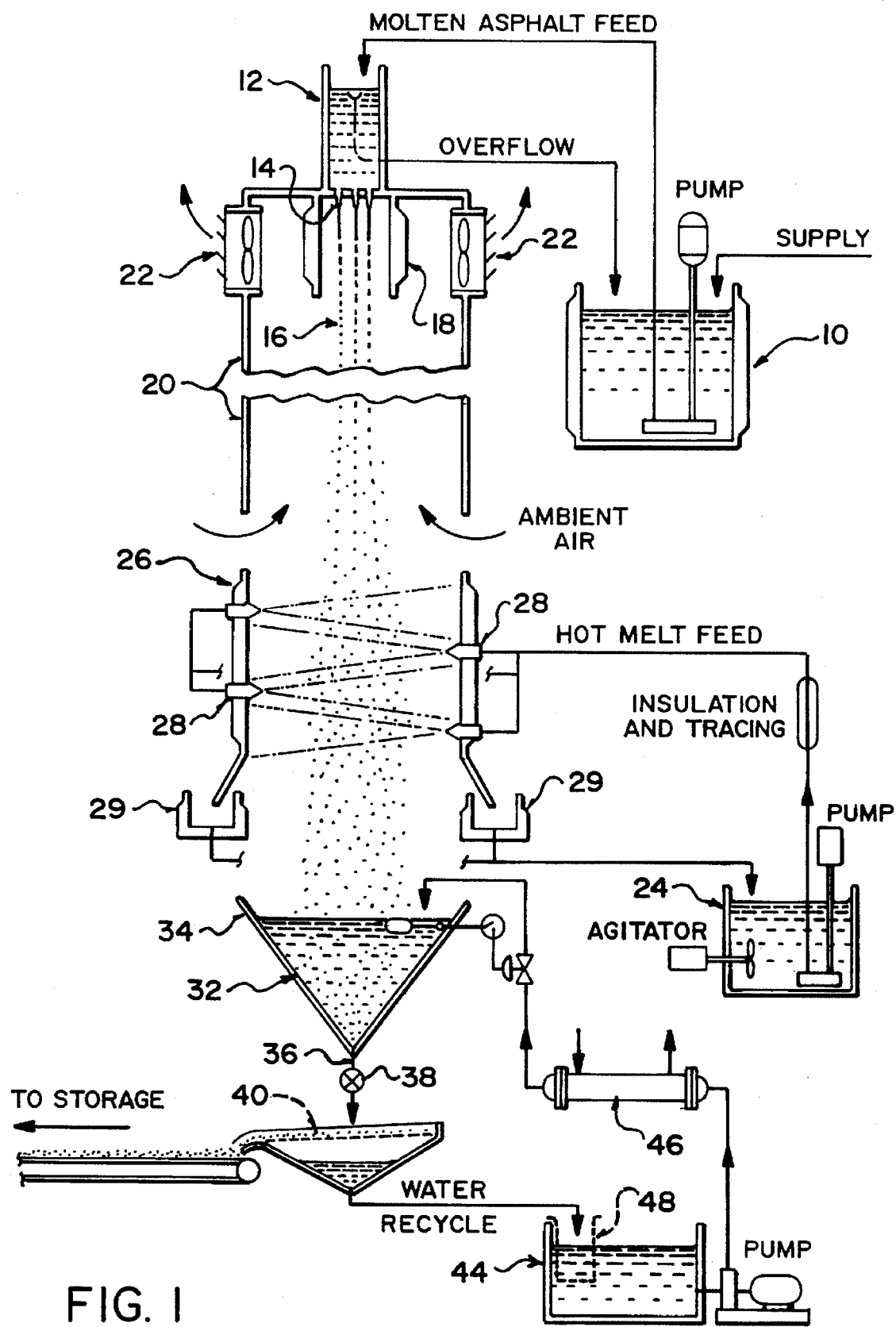
FIG. 1 is a schematic diagram of a first process for producing the invention.

In a first, hot-melt embodiment of the encapsulating method, illustrated in FIG. 1 a 100 PEN industrial asphalt is used to produce the solid product. Molten asphalt from the Molten Asphalt Feed Tank 10 is transferred by a submerged pump to the Molten Asphalt Spray Tank 12 having spray nozzles 14. The bottom of the Molten Asphalt Spray Tank 12 contains a multiplicity of nozzles 14 which allow the molten asphalt to flow in individual streams through the Prill Forming Chamber 18 on which the spray tank is mounted.

In the Molten Asphalt Spray Tank 12, the temperature of the asphalt melt and the pressure (hydrostatic head) are closely controlled. The temperature is controlled at 225 degree F. and the asphalt level at 12" hydrostatic head. These variables and the orifice diameter of the spray nozzles 14 are set to produce asphalt droplets in the range of 1/32" to 1/8" diameter. It is preferred to produce spherical droplets so that the prills formed are generally spherical in shape to reduce surface contact between adjacent prills.

Droplets 16 leaving the asphalt spray nozzles 14 fall through the Prill Forming Chamber 18 which insures that the streams from the nozzles 14 break up properly due to surface tension into separate, uniform droplets with a minimum of "stringing", a common problem with sticky, viscous materials. The temperature in Prill Forming Chamber 18 is held slightly above that of the asphalt melt in the spray tank. From the hot chamber 18, the molten asphalt droplets fall through Prilling Tower 20 where they are pre-cooled by a counter-current flow of ambient air and where some external solidification of the prills occurs. The cooling air is induced upward through the Prilling Tower by two Induced Draft Fans 22 which pull ambient air through the tower. The fans are damper-controlled to maintain a controlled air flow velocity in the range of 500–1000 feet per minute, the settings being dependent on the prevailing ambient air temperatures and the degree of prill cooling required. The velocity is set as low as possible consistent with the amount of prill surface pre-cooling necessary prior to encapsulation. This pre-cooling is usually needed to prevent distortion of the prills when they are subsequently spray-coated. The amount of pre-cooling needed depends on the type of material being sprayed onto the prills in the coating chamber.

At this point, the droplets are coated with one of the various water-insoluble molten fatty acids, low-melt polymers, polymer waxes or waxes or a mixture thereof which I have found make satisfactory encapsulations. Such materials should have a melting point greater than 150 degrees F. (65 degree C.) so as to remain solid over the usual range of ambient temperatures. An example of such a low-melt polymer is ethyl vinyl acetate. An example of a polymer wax is a low-melting polyethylene like CARBOWAX™. The preferred molten encapsulating material used in this embodiment is a mixture of 90% stearic acid and 10% of a commercial hot-melt adhesive of the sort used in hot-melt adhesive glue guns. Although the stearic acid itself provides good encapsulation, the added resin of the adhesive produces a coating that is structurally stronger and much less subject to cracking and abrasion. The hot-melt spray system consists of a heated feed tank submerged pump, and a system of heated piping and valves feeding the spray nozzles, which are carefully oriented and spaced. The coating mixture is stored in the Molten Coating Feed Tank 24 at 200 degrees F. and pumped at this temperature and a pressure of 20 psig through heated lines to the Encapsulating Chamber 26 which has four spray nozzles 28. The encapsulating spray nozzles are conventional and of the general type used for spray booth panting applications. The prills passing down through the Encapsulating Chamber 26 are coated with preferably from 4 to 5% by weight of retained coating material, the degree of retention of the coating depending on the type of nozzle used and the spraying pressure. The coating comprise between 0.5% to 10% by weight of the encapsulated asphalt prill.

Excess molten spray collects on the hot sides of the spray chamber 26, running down into a collecting trough 29 which returns the recycled molten coating material to the feed tank 24. The wall of the cylindrical Encapsulation Chamber 26 is set at a temperature of about 250 degrees F. so that the overspray hitting the wall will be kept molten and flow down into the Melt Collecting Trough 29 from which it flows by gravity back to the Molten Coating Feed Tank 24.

The prills encapsulated with still-molten coating fall into the Collecting Bath 32 which in this embodiment is a water-filled cone hopper 34 with a bottom discharge 36. Both coating and prills are immediately and completely solidified upon dropping into the 70 degree F. water and drift down into the bottom of the cone hopper 34. The mixture of encapsulated prills and water exiting the cone is restricted by a control valve 38 which is set to let all of the prills out with the minimum amount of flushing water. The level of cooling water in the Collecting Bath 32 is maintained by a level control valve in the water recycle line. Water and prills from the water bath are separated by screening with the water recycled through a heat exchanger to remove the heat picked up from the prills.

The product prills from the Collecting Bath 32 are separated from the water in a 30-mesh vibrating Screen Separator 40, the prills going on to a conveyor 42 which sends the cold and encapsulated prills without drying to loading or storage, and the water from the Screen Separator 40 flowing by gravity back to the Water Feed Tank 44. Makeup water to the Collecting Bath 32 is pumped from the Water Feed Tank 44 through the Recycled Water Cooler 46 which removes the heat picked up from the hot prills by the water in the Collecting Bath 32. A small, removable screen 48 in the Water Feed Tank 44 removes any fine materials picked up in the recycled water.

AMBIENT LIQUIDS ENCAPSULATION METHOD

Figure 2:
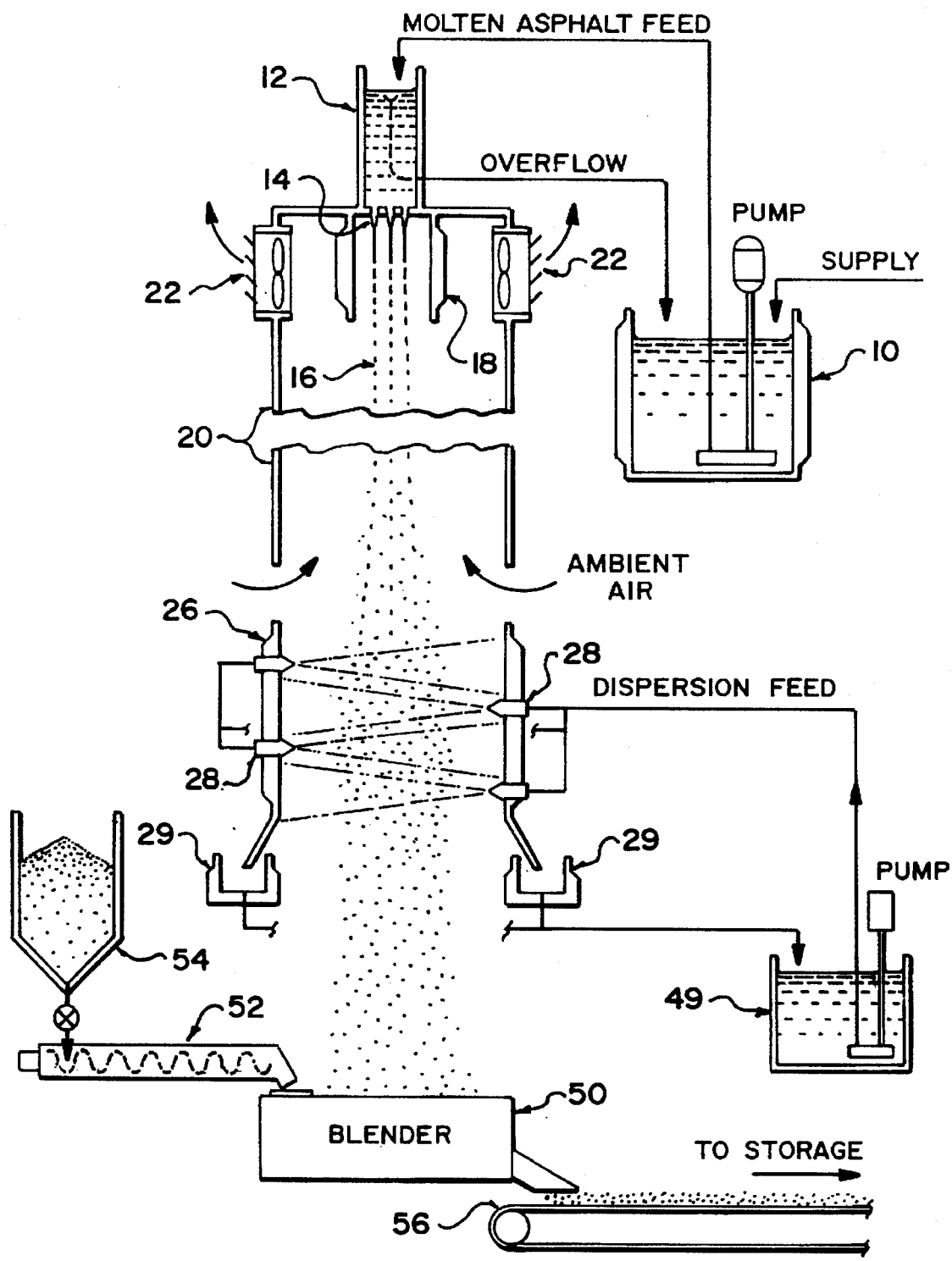
FIG. 2 is a schematic diagram of a second process for producing the invention.

In a second ambient temperature liquid embodiment of the encapsulating method, illustrated in FIG. 2, the asphalt prills are produced in the same manner as described in the FIG. 1 embodiment up to the point at which the prills enter the Encapsulating Chamber 26. The droplets from the prilling tower are spray-coated with one of several aqueous elastomer (synthetic rubbers) or plastomer dispersions which I have found make satisfactory encapsulating agents. The preferred coating material used in the Encapsulating Chamber 26 of this embodiment is a high-solids cationic styrene-butadiene dispersion containing 63% of solids by weight, manufactured under the designation NS-198 by BASF Corp., Chemicals Division of Chattanooga, Tenn. (The corresponding anionic product NS-104 will also work.) This is diluted with water to a 50% solids dispersion to reduce viscosity and premature drying. The coating material is supplied to the Encapsulating Chamber's four nozzles 28 by a pump in the Dispersion Feed Tank 49, and the overspray is handled in the same manner as the hot-melt embodiment except that no heating is required anywhere in the coating handling system. Also, the nozzles 28 used for the encapsulation in this embodiment are of the type used in spraying heavy latex formulations. The amounts of coating applied by this dispersion were as high as 10%, but could be controlled at lower loadings by proper nozzle selection, higher spray pressures, and more dilution of solids in the dispersion. In this embodiment at a spraying pressure of 30 psig, the nozzles applied 6–7% by weight coating.

The encapsulated prills which are cooled to solidification but are still wet with coating drop into a mixing device, Bender 50 where they are agitated with a −300 mesh diatomaceous earth fed into the Blender 50 by the screwtype Variable Speed Feeder 52 below the Drying Agent Hopper 54, to enhance drying of the coating. The powder adheres to the wet surface of the encapsulated prills absorbing water from the coating and solidifying the shell. The amount of diatomaceous earth powder picked up by the wet prills is about 0.2 to 0.5% based on the weight of the product prills after all water from the coating and powder has evaporated. The now free-flowing encapsulated and powder-dusted prills are then transferred to storage or loading by conveyor 56. Instead of diatomaceous earth, other similar powders or dust of hydrated lime, ground sand, talc, cement or calcium sulphate would also by suitable.

The encapsulating, water-insoluble coatings of my invention are impervious to both penetration and leaching in order to prevent the problems caused by agglomeration. In addition, they reduce the tendency of soft prills to sag and flatten under hot conditions or excessive pile pressure. Other advantages of my encapsulated product include the avoidance of unpleasant asphalt odours and reduction of oxidative deterioration. The coatings can be composed primarily of materials that are used to enhance the final use properties of commercial asphalt products. By using the enhancing materials or blending agents for encapsulation, a separate blending step can be avoided.

Impervious encapsulation of asphalt prills enables successful production of a commercially viable solid asphalt product which can be manufactured, stored, and transported without unmanageable agglomeration or degradation of the product. Such a product also has important economic and social advantages. The encapsulated solid product saves the immense energy costs for keeping asphalt molten. Shipping costs would be drastically lower. There is also no environmental polluting whatsoever until the asphalt is again melted down at the ultimate point of usage.

As will be apparent to those skilled in the art in the light of the foregoing disclosure many alterations and modifications are possible in the practice of this invention without departing from the spirit or scope thereof. Accordingly, the scope of the invention is to be construed in accordance with the substance defined by the following claims. While prills have been selected as the preferred embodiment for the particles to be encapsulated in this invention, but other types of small particles such ads those made from extruders or pelletizers would be equally applicable.

What is claimed is:

1. A process for making encapsulated asphalt prills comprising the steps of:
    i) spraying molten asphalt so that it breaks up into droplets;
    ii) spraying said droplets with a hot liquid coating which is solid at ambient temperatures and water-insoluble and water impervious at ambient temperatures and which has a melting point greater than 150 degrees Fahrenheit and wherein said coating comprises a material suitable for use as an asphalt additive,
    iii) cooling said coating to thereby completely encapsulate said droplets with a solid water-impervious, water-insoluble shell of material suitable for use as an asphalt additive.

2. The process of claim 1 wherein said molten asphalt is a penetration asphalt in the range 0 to 500 PEN.

3. The process of claim 1 wherein said droplets are in the size range of 1/32" to 1/8" in diameter.

4. The process of claim 1 wherein said solid coating comprises between 0.5% to 10% by weight of the encapsulated asphalt prill.

5. The process of claim 1 wherein said material suitable for use as an asphalt additive is selected from the group consisting of fatty acids, polymers, wax or mixtures thereof.

6. The process of claim 1 wherein said cooling step comprises cooling said coated droplets in a bath.

7. A process for making encapsulated asphalt prills comprising the steps of:
    i) spraying molten asphalt so that it breaks up into droplets;
    ii) spraying said droplets with a liquid coating which is liquid at ambient temperatures and water-insoluble and water-impervious when solidified and wherein said coating comprises a material suitable for use as an asphalt additive,
    iii) drying said coating to thereby completely encapsulate said droplets with a solid water-impervious, water-insoluble shell of material suitable for use as an asphalt additive.

8. The process of claim 7 wherein said liquid coating which is liquid at ambient temperatures is selected from the group consisting of aqueous elastomers and plastomer dispersions.

9. The process of claim 7 wherein said liquid coating which is liquid at ambient temperatures is selected from the group consisting of cationic or anionic styrene-butadiene dispersions.

10. The process of claim 7 wherein said coating is dried by applying a powder coating.

11. The process of claim 10 wherein said powder coating is selected from the group consisting of distomaceous earth, hydrated lime, ground sand, talc, cement and calcium sulphate.

* * * * *